July 7, 1931.  G. E. MERRYWEATHER  1,813,503
GRINDING MACHINERY
Filed Oct. 3, 1927   2 Sheets-Sheet 1
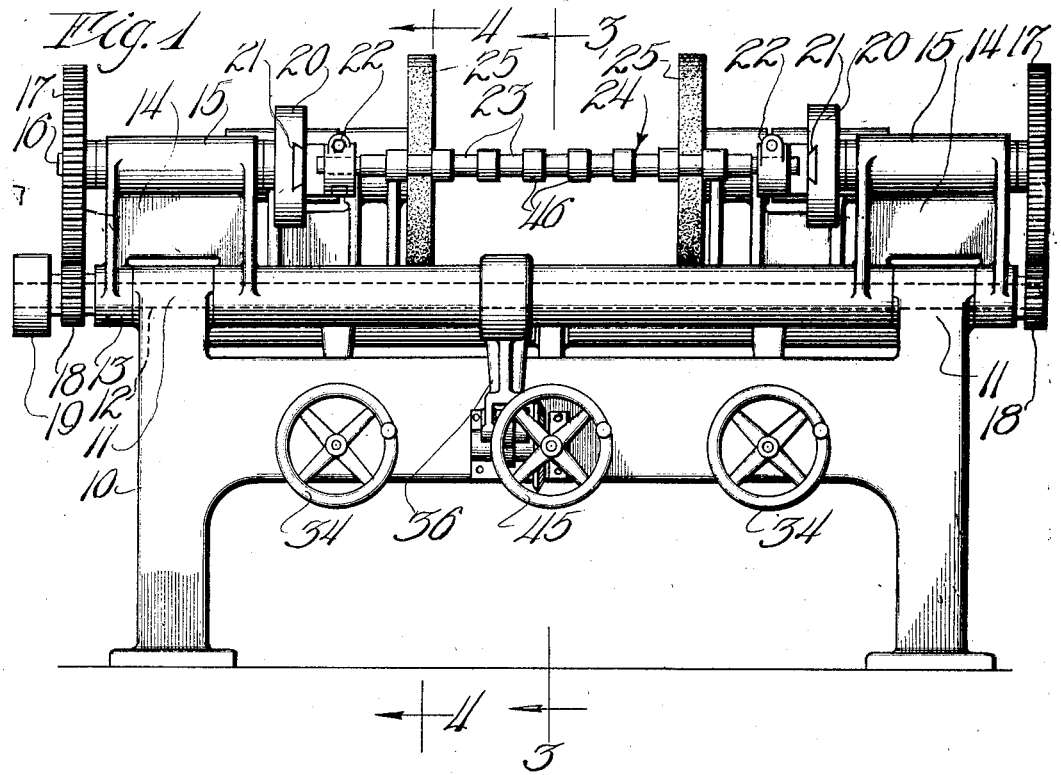
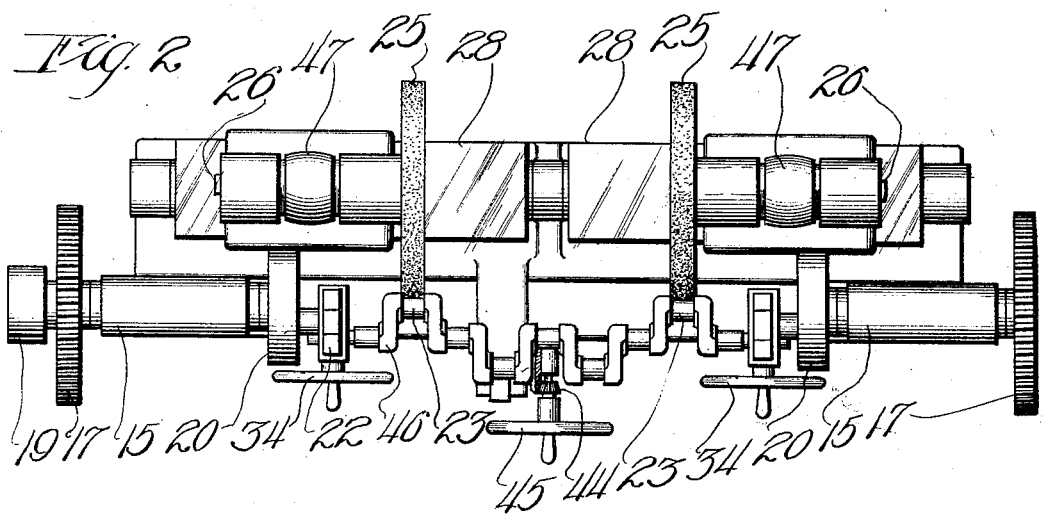
Inventor
George E. Merryweather
By Fay, Oberlin & Fay
Attorneys July 7, 1931.  G. E. MERRYWEATHER  1,813,503
GRINDING MACHINERY
Filed Oct. 3, 1927    2 Sheets-Sheet 2
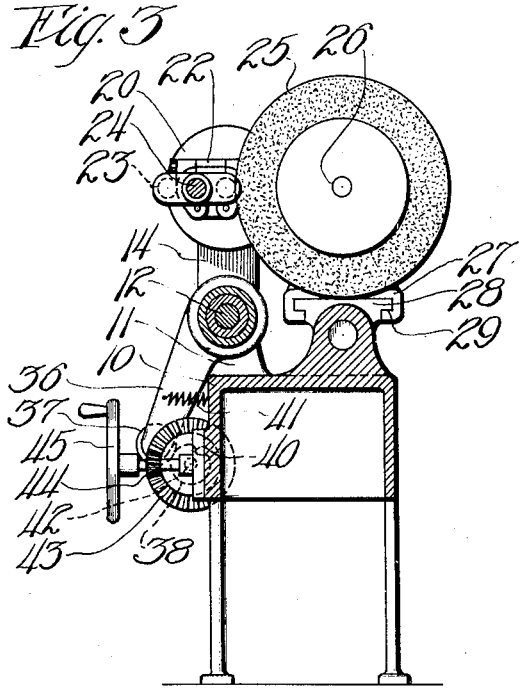
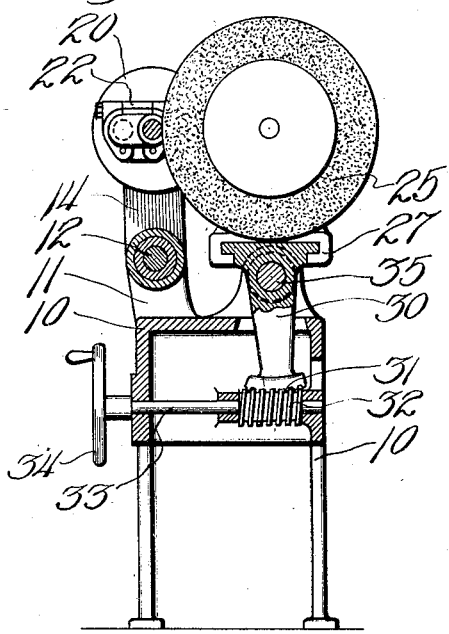
Inventor
George E. Merryweather
By Fay, Oberlin & Fay
Attorneys Patented July 7, 1931

1,813,503

UNITED STATES PATENT OFFICE

GEORGE E. MERRYWEATHER, OF CLEVELAND HEIGHTS, OHIO; LAURA E. MERRYWEATHER, EXECUTRIX OF SAID GEORGE E. MERRYWEATHER, DECEASED, ASSIGNOR TO THE MOTCH & MERRYWEATHER MACHINERY COMPANY, OF CLEVELAND, OHIO, A CORPORATION OF OHIO

GRINDING MACHINERY

Application filed October 3, 1927. Serial No. 223,568.

This invention relates to improvements in grinding machinery and has particular reference to a machine especially adapted for use in the grinding of crank shafts or other work pieces having a plurality of spaced portions for individual grinding as distinguished from that type of work piece in which complete longitudinal grinding may be performed by either the plunge cut method or the work traversing method.

One of the objects of the present invention is the provision of an improved machine for simultaneously acting upon spaced portions of a work piece to increase the productivity of the machine.

A further object of the present invention is the provision of a machine of this type in which the work and grinding members may be readily simultaneously adjusted one toward the other for feed of the parts.

Another object of the invention is the provision of a structure of this type in which the grinding members may be individually adjusted relative to the work piece to compensate for unequal wear or for size variations to be effected.

An additional object of the invention is the provision of a machine of the type specified in which the longitudinal relationship between the work and individual grinding wheel for operation thereon may be readily adjusted to the end that the grinding wheel may be successively brought into operative relation with a number of different portions of the work piece without the necessity of removal of the work piece.

Still another object is the provision of a machine in which the concentricity or eccentricity of the work piece with respect to the driving or rotating member therefor may be varied as desired without disconnection or disassociation of the work piece and securing clamp therefor.

Other objects and advantages of the present invention should be readily apparent by reference to the following specification taken in connection with the accompanying drawings, and it will be understood that I may make any modifications in the specific structural details hereinafter disclosed within the scope of the appended claims, without departing from or exceeding the spirit of the invention.

Figure 1 is a front elevation of a machine embodying my improvements.

Figure 2 is a plan view thereof.

Figure 3 is a vertical section as on the line 3—3 of Figure 1, and

Figure 4 is a similar section as on the line 4—4 of said figure.

In the drawings in which similar characters of reference are employed to denote corresponding parts throughout the several views, the numeral 10 designates the base or bed of a machine having the journals 11 for the transverse shaft 12. This shaft extends from end to end of the machine, forming a pivot center about which swings the sleeve portions 13 of the work carrier. The work carrier 14 has journals 15 for the pair of headstock shafts 16. These shafts bear gears 17 meshing with pinions 18 on the shaft 12. Shaft 12 may have power suitably applied thereto as through pulley 19 and through the gear and pinion connection serves to simultaneously synchronously rotate the headstock plates 20 which are carried by the inner ends of the shafts 16. These headstocks are provided with the guide ways 21 for the sliding work clamps 22 which may be given an in and out adjustment relative to the axis of the head plates 20 according to the off-center position at which it is desired to locate the termini of the work piece.

The purpose of this eccentric location of the termini of the work piece should be readily understood by reference to Figures 2 and 3 for example, from which it will be noted that this decentration or eccentric mounting is sufficient to axially align the individual crank pin portions 23 of the work piece such as crank shaft 24 with the axes of shafts 16. Consequently, when the shafts 16 are rotated the pin portions 23 will also be revolved about their centers for proper grinding by the grinding wheels 25.

These grinding wheels 25 are mounted on shafts 26 carried by the slides 27 mounted on individual rocking supports 28 having ways 29 interlocking with the slides. Each rocking support has a depending arm 30 terminating in an arcuate worm rack 31 meshing with worm 32 on shaft 33. This shaft extends to the front of the bed 10 and is provided with a hand wheel 34 by which it may be rotated, serving through the worm and rack engagement to rock support 28 about the trunion 35 and thus vary the in and out adjustment of the individual grinding wheel with respect to the work.

At the same time the swinging carriage 14 is provided with a depending arm 36 having a roller 37 riding on cam 38. This cam may be driven in any suitable manner to cause a slow rotation thereof, gradually moving arm 36 outward and imparting a corresponding inward movement to swinging carriage 14 and the work piece carried thereby. This swinging cam operating movement definitely establishes the rate of feed of the work toward the grinning wheels. The cam may in addition be so shaped as to produce a dwell or sparking out action on the work and then presents the cutaway portion 40 of the cam to roller 37 when the weight of arm 36 and of the work piece and work head itself will tend to swing the carriage 14 to move the work away from the grinding wheel. If desired, a spring or the like 41 may be additionally employed to actuate and insure this retracting movement.

In the form shown the cam is indicated as mounted on the cam shaft 42 which also bears gear 43 meshing with pinion 44 operable by hand wheel 45. It will be understood that this provides a purely manual control for gradual operation of the cam to swing the work in for the feeding cut and subsequently permit of retraction thereof. However, if preferred, it is equally possible to employ a suitable power actuation of cam 38 which feature I consider within the purview of the present invention.

From the foregoing description the operation of the present machine should be readily understood and it will be noted that slides 27 may be longitudinally adjusted on their tiltable supports carried by bed 10 to properly position the grinding wheel opposite individual crank pin 23 and feeding between the check blocks 46. When the parts have been brought into this position a perfectly gauged work piece or a suitable setting mechanism may be utilized to determine the rocking of individual arms 30 to bring the grindstone in to final depth of cut as indicated in Figure 3. It is to be understood that in this setting the cam 38 is likewise rotated to cause maximum inward swinging of the work carriage. The parts having been brought into this proper adjustment, cam 38 is rotated until the work carrier can swing outward and a work piece suitably mounted within the clamps 22 therefor. Upon starting up of the machine as by application of power to the grinding wheels through pulleys 47 and rotation of the work through application of power to pulley 19, the work will be caused to rotate about the proper predetermined axes of the crank pin or pins being ground. Rotation of cam 38 will then cause proper feed of the work toward the grinding wheel, so that the stock at a predetermined distance from the axis of the pin will be properly ground off, forming an accurately round pin portion of predetermined diameter, the cam shifting the carriage to produce a final sparking out or cleaning up of all points on the work, after which its continued movement allows the work carriage to swing outward away from the grinding wheel when the operator may transversely shift the wheels to engage new and different portions on the work piece or may remove the ground work piece and substitute a new one.

Occasional gauging of the work parts being ground make it possible to accurately determine if one grinding wheel is wearing slightly more than the other, in which event rotation of hand wheel 34 will cause proper adjustment of the individual grinding wheel to compensate for wear thereof.

I claim:—

1. A grinding machine of the character described, including a bed or support, a plurality of grinding wheel carriages longitudinally movable thereon, means for individually imparting in and out of adjustment to said grinding wheel carriages, a work holder mounted on the support adjacent the grinding wheel carriages, and cam means for imparting an in and out movement to the work holder as respects the grinding wheels.

2. A grinding machine of the character described, including a bed or support, a plurality of grinding wheel carriages longitudinally movable thereon, means for individually imparting in and out movement to said grinding wheel carriages, a work holder mounted on the support adjacent the grinding wheel carriages, and means for imparting an in and out movement to the work holder as respects the grinding wheels, said means including a cam producing a definite cyclic relative shifting of the parts.

3. A grinding machine for simultaneously operating upon spaced portions of a work piece, including a pivotally mounted work support, a plurality of sets of grinding wheel supports in spaced relation, means for imparting a relative feeding movement to the work holder and the grinding wheel supports, and means for individually adjusting the grinding wheel supports to compensate for wheel wear.

4. A machine of the character described, including a bed or support, a work holder carriage mounted thereon for swinging movement, a plurality of grinding wheel supports mounted on the bed for swinging movement toward and from the work carriage, and independent mechanisms for controlling the swinging movement of the individual parts.

5. A machine of the character described, including a bed or support, an oscillatable work carrier mounted thereon and having spaced work engaging portions, a plurality of separately adjustable grinding members carried by the bed and longitudinally adjustable thereon, and means for controlling the oscillatory movement of the work carriage with respect to the grinding members.

6. A machine of the character described, including a bed or support, a plurality of grinding members oscillatably mounted thereon, means for individually regulating the position of said grinding members, a work carriage including spaced work supports carried by the bed, and means for jointly oscillating the work supports in the direction of the grinding members.

7. A machine of the character described, including a bed or support, a plurality of grinding members oscillatably mounted thereon, means for individually regulating the position of said grinding members, a work carriage including spaced work supports carried by the bed, and means for jointly oscillating the work supports in the direction of the grinding members, said means including a cam and cam follower, and means for rotating the cam.

8. A machine of the character described, including a bed or support, an oscillatable work carriage carried thereby, spaced work engaging members mounted on the carriage, means for synchronously rotating said members, work clamps carried by said members and individually adjustable as respects the axis of rotation thereof, a plurality of separately adjustable work grinding means carried by the bed, and means for oscillating the work clamping members in the direction of the work grinding means.

9. A machine of the character described, including a bed, a pivotally mounted work support, a plurality of units oscillatably mounted upon the bed, spaced grinding members supported by certain of the units for relative axial adjustment and means for oscillating said supporting units to vary the position of the axes of said grinding members.

10. A machine of the character described, including a bed or support, a plurality of units oscillatably mounted upon the bed or support, grinding members supported by certain of the units for relative axial adjustment, means for oscillating said supporting units to vary the position of the axes of said grinding members, work supports carried by one of the oscillatable units and means for oscillating the work supports toward and from the grinding members.

11. A grinding machine of the character described, including a bed, a driven shaft carried by the bed, a work carriage oscillatably mounted on the shaft, spaced work supports journalled in the carriage, said work supports including headstock plates and sliding work-clamps, means transmitting power from the shaft to said supports for synchronous rotation thereof, a plurality of separately adjustable grinding means carried by the bed, and cam means for oscillating the carriage about the shaft to vary the relationship of the supports and grinding means.

Signed by me this 30th day of September, 1927.

GEORGE E. MERRYWEATHER.